United States Patent
Profera et al.

(10) Patent No.: US 8,801,199 B2
(45) Date of Patent: Aug. 12, 2014

(54) REFLEX REFLECTOR WITH INTEGRATED ACCENT PIECE

(75) Inventors: Ryan E. Profera, Marysville, OH (US); Darrin T. Roberts, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 211 days.

(21) Appl. No.: 13/463,312

(22) Filed: May 3, 2012

(65) Prior Publication Data
US 2013/0293960 A1    Nov. 7, 2013

(51) Int. Cl.
*G02B 5/124*    (2006.01)
(52) U.S. Cl.
USPC .......................................................... 359/534
(58) Field of Classification Search
CPC .................................. G02B 5/12; G02B 5/126
USPC .......................................................... 359/534
See application file for complete search history.

(56) References Cited

U.S. PATENT DOCUMENTS

| | | |
|---|---|---|
| 2,030,255 A | 6/1933 | Howard |
| 2,365,447 A | 12/1944 | Best |
| 4,154,504 A | 5/1979 | Mohs |
| 4,584,631 A | 4/1986 | Cody et al. |
| 7,175,293 B2 | 2/2007 | Egashira et al. |
| 7,331,683 B2 | 2/2008 | Egashira et al. |
| 7,823,938 B2 | 11/2010 | McKee et al. |
| 2004/0012975 A1 | 1/2004 | Chase et al. |
| 2004/0216406 A1 | 11/2004 | Egashira |
| 2007/0127248 A1 | 6/2007 | Egashira et al. |
| 2010/0176608 A1* | 7/2010 | Schelberg et al. ............ 293/117 |
| 2010/0232174 A1 | 9/2010 | Arakawa et al. |
| 2010/0246198 A1 | 9/2010 | Hook et al. |

FOREIGN PATENT DOCUMENTS

JP    6171445 A    6/1994

* cited by examiner

*Primary Examiner* — Euncha Cherry
(74) *Attorney, Agent, or Firm* — Capitol City TechLaw, PLLC; Mark E. Duell

(57) ABSTRACT

A reflex reflector can include a base having a portion covered with a metallic coating and a portion that is not covered with a metallic coating. A reflector lens can be mounted on only the portion without the metallic coating. The portion of the base with the metallic coating remains exposed and serves as an accent piece. The reflex reflector can be mounted in a recess provided in a bumper cover for a vehicle.

19 Claims, 6 Drawing Sheets

REFLEX REFLECTOR WITH INTEGRATED ACCENT PIECE

BACKGROUND

1. Field

This disclosure relates in general to a reflex reflector, and more specifically, to a reflex reflector incorporating an accent piece.

2. Discussion of Related Art

It is well known to integrate various components with the bumper of a vehicle. For example, reflex reflectors are commonly applied to the bumper of a vehicle. The reflex reflector is designed to render the vehicle more noticeable by reflecting back to a viewer a portion of the light impinging upon the reflector.

With reference to FIG. 1, a conventional reflex reflector 2 includes a reflector lens 4 having internal structure (not shown) adapted to redirect and reflect light by means of internal reflection. Reflector lenses, which are typically fabricated from plastic and glass, are rigid and relatively fragile. Therefore, the reflector lens 4 is mounted on a support frame or base 6. The reflex reflector 2 (inclusive of the reflector lens 4 and the base 6) can be mounted in a recess provided in the bumper cover 10 of a vehicle. Typically, fasteners (not shown) will connect the reflex reflector 2 to the bumper cover 10. Once mounted, the base 6 is concealed and hidden from view behind the reflector lens 4.

Decorative accent pieces are also applied to the bumper of a vehicle. An accent piece can be located on the bumper cover next to the reflex reflector. An accent piece can also completely surround a reflex reflector to form a decorative bezel. Such accent pieces typically include a base material with a metallic coating. The metallic coating gives the accent piece a polished appearance or a mirror-like finish.

Known structures that integrate vehicle components into a bumper cover are generally thought to be acceptable, but they are not without shortcomings. Specifically, according to conventional wisdom, the reflex reflector and the accent piece are provided as separate and distinct parts, which can make assembly of the vehicle difficult and cumbersome. For example, it can be difficult to control the alignment between the reflex reflector, the accent piece, and the bumper cover. Further, each individual part requires separate handling and separate connectors at installation.

Clearance gaps may also exist between the reflex reflector and the accent piece. Such gaps can widen over time and lead to vibration and wind noise. Further, the gaps between the parts may be uneven and detract from the aesthetic appearance of the bumper cover.

SUMMARY

According to a non-limiting embodiment, a reflex reflector can include a base having a first portion with a metallic coating and a second portion without a metallic coating. A reflector lens can be mounted on only the second portion of the base. The first portion and the second portion of the base can be of a unitary, one-piece construction.

According to another non-limiting embodiment, a bumper assembly can include a bumper cover having a recess. A reflex reflector can be mounted in the recess. The reflex reflector can include a base having a first portion with a metallic coating and a second portion without a metallic coating. The reflex reflector can also include a reflector lens mounted on only the second portion of the base. The first portion and the second portion of the base can be of a unitary, one-piece construction.

The above and other features, including various and novel details of construction and combinations of parts will be more particularly described with reference to the accompanying drawings. It will be understood that the details of the example embodiments are shown by way of illustration only and not as limitations of the invention. The principles and features of this invention may be employed in varied and numerous embodiments without departing from the scope of the invention.

BRIEF DESCRIPTION OF THE DRAWINGS

Non-limiting embodiments will become more fully understood from the detailed description below and the accompanying drawings, wherein like elements are represented by like reference numerals, which are given by way of illustration only and thus are not limiting of the present invention.

DESCRIPTION OF NON-LIMITING EMBODIMENTS

This disclosure is directed to a reflex reflector that may be suitably installed on the bumper of a vehicle. It will be appreciated, however, that the reflex reflector can be used to mark any other object. According to non-limiting embodiments, the reflex reflector includes a base having a portion covered with a metallic coating and a portion that is not covered with a metallic coating. A reflector lens is mounted on only the portion without the metallic coating. In this way, the portion of the base with the metallic coating may serve as an accent piece, and need not be separately provided and/or installed during assembly of the bumper cover.

In this disclosure, the term "metallic coating" refers to a layer or film of material that contains metal. By way of example only, the metallic coating may include aluminum, chrome, gold, nickel, silver, tin and/or a resin in which metallic powder is distributed. By way of example only, the metallic coating may be formed by evaporation, sputtering, electrolytic deposition, painting, or printing of the metallic material. The metallic coating can provide a polished, shiny, and/or minor-like appearance.

In the following embodiments, the metallic coating is chrome. It will be appreciated, however, that the material of the metallic coating is not particularly limited.

Figure 1:
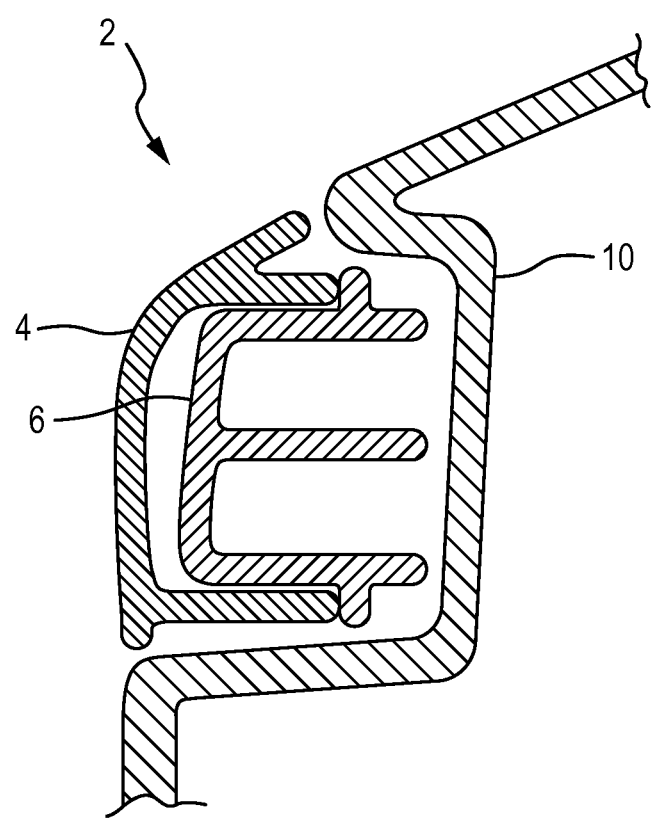
FIG. 1 is a schematic view of a conventional reflex reflector.
Figure 2:
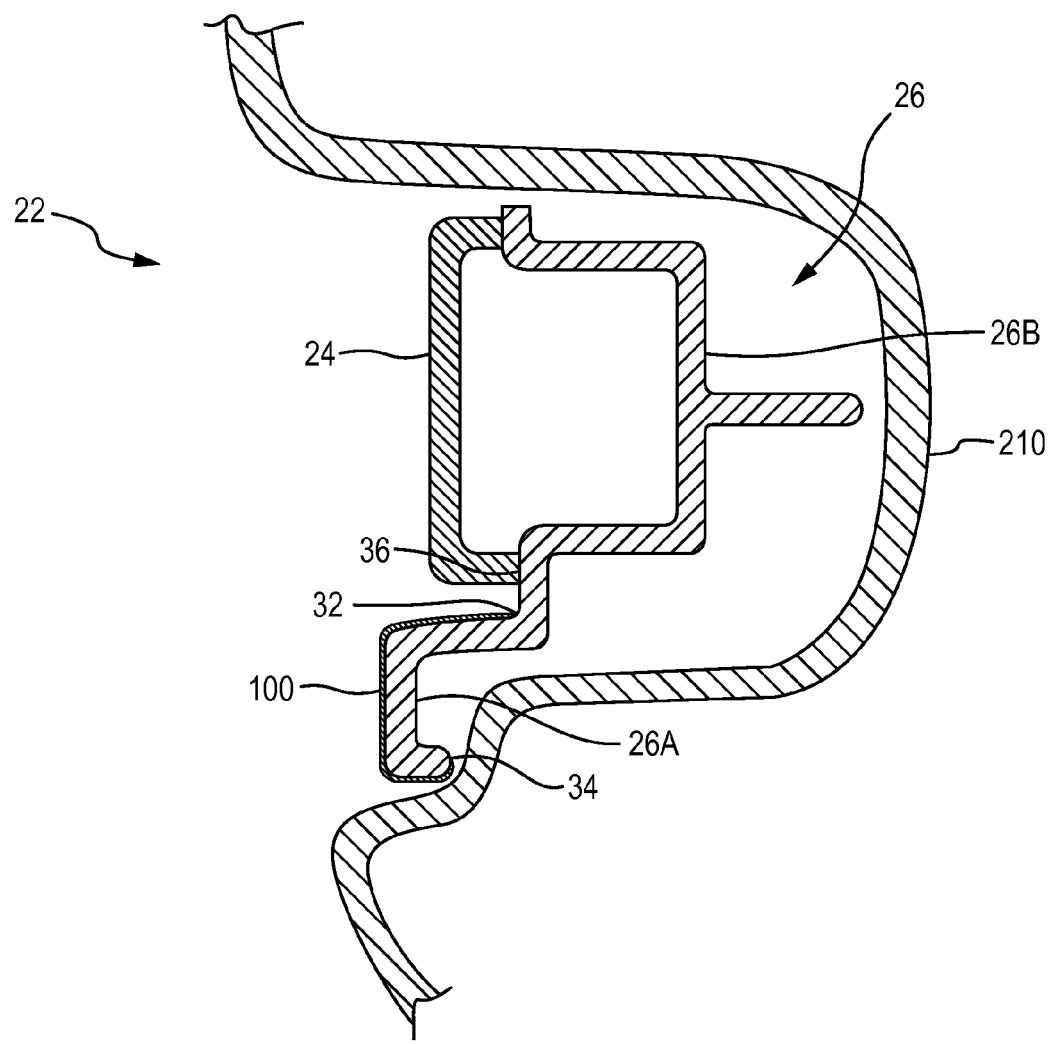
FIG. 2 is a schematic view of a reflex reflector according to a non-limiting embodiment.

With reference to FIG. 2, the reflex reflector 22 includes a reflector lens 24 mounted on a base 26. The reflector lens 24 and the base 26 can be fabricated from numerous and varied materials that are well known in this art. By way of example only, the reflector lens 24 can be fabricated from glass or plastic, and the base 26 can be fabricated from metal or plastic. The reflex reflector 22 (inclusive of the reflector lens 24 and the base 26) is mounted in a recess provided in the bumper cover 210 of a vehicle. By way of example only, fasteners (not shown) can connect the base 26 to the bumper cover 210.

The base 26 includes a first portion 26A and a second portion 26B, which are of a unitary, one-piece construction. The surface of the first portion 26A is provided with a chrome finish 100. The second portion 26B of the base is not provided with a chrome finish.

The reflector lens 24 is mounted on only the second portion 26B (that is, the non-chromed portion) of the base 26. Thus, when the reflex reflector 22 is installed on the bumper cover 210, the second portion 26B of the base 26 can be hidden from view behind the reflector lens 24, while the first portion 26A of the base 26 remains exposed and viewable (for example, from the left in FIG. 2). In this way, the first portion 26A can serve as an accent piece around the reflector lens 24.

In this example embodiment, the first portion 26A of the base 26 is directly below the reflector lens 24. In alternative embodiments, the first portion (or chromed portion) of the base may be situated next to, above, and/or completely surround the reflector lens 24. It will be appreciated that the layout of the reflector lens 24 relative to the accent piece may be varied as desired.

As shown in FIG. 2, the first portion 26A of the base 26 extends in an outward direction (that is, to the left) beyond the second portion 26B. The first portion 26A also extends in the outward direction beyond the reflector lens 24. The relative outward positioning of the first portion 26A may increase the prominence of the accent piece. It will be appreciated, however, that the present teachings are not limited in this regard. For example, the outward most surface of the first portion 26A can be flush with the outward most surface of the reflector lens 24, or the reflector lens 24 can extend in the outward direction beyond the first portion 26A. The second portion 26B of the base 26 can also extend in the outward direction beyond the first portion 26A.

The chrome finish 100 need not be applied to the entire surface of the first portion 26A. In FIG. 2, for example, the chrome finish 100 is provided on the outward facing surface between a pair of spaced apart locations 32, 34 that extends into the plane of the drawing sheet. Thus, the outward facing surface of the base 26 between the location 32 and the lower mounting location 36 of the reflector lens 24 may not be chromed. Also, the inward facing surface (that is, facing toward the right in FIG. 2) of the first portion 26A may not be chromed. The extent of the chrome finish 100 on the first portion 26A can be chosen based on numerous and varied considerations, including but not limited to aesthetics, costs, processing capabilities, bumper cover design, etc. The chrome finish 100 does not, however, extend into the area onto which the reflector lens 24 is mounted.

By way of example only, the chrome finish 100 may be applied using conventional techniques that involve electroplating a layer of chromium onto a base. Various other deposition systems that are well known in this art may be suitably implemented. Numerous pretreatments may also be applied to the base, and such pretreatments may vary depending on the base material being plated. Well known base materials include metals and plastics. The thickness of the chrome finish may be varied.

Figure 3:
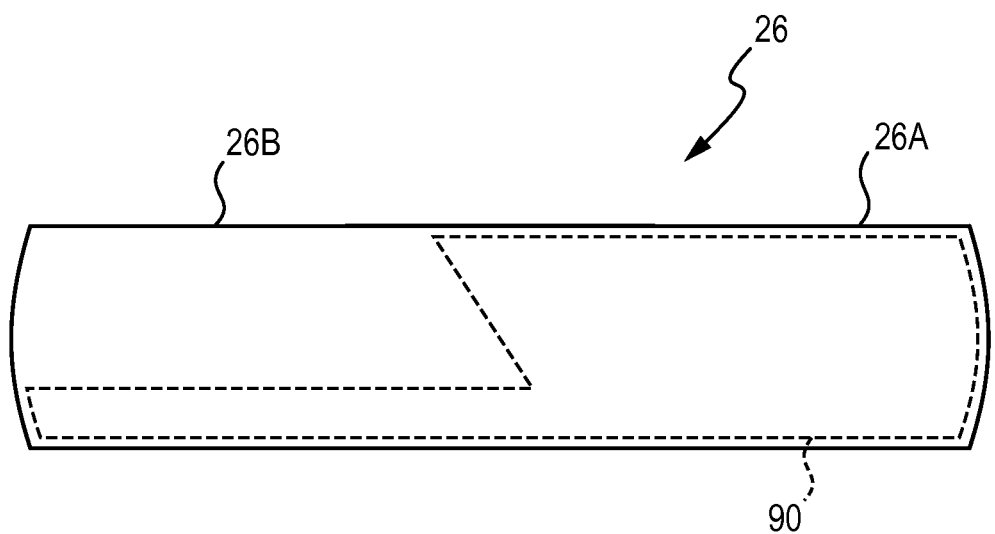
FIG. 3 is a schematic view of a base of a reflex reflector according to a non-limiting embodiment.

An example process for applying a chrome finish will be appreciated with reference to FIG. 3, which schematically depicts the outward facing surface of the base 26. The outward facing surface is depicted as being flat for convenience. Typically, however, the outward facing surface will be contoured having peaks, valleys, and/or other planar or curvaceous surface features.

Initially, the surface of the first portion 26A to be chromed is masked off and covered, leaving the remaining portions of the base 26 (inclusive of the entire second portion 26B) exposed. The area to be masked and eventually chromed is demarcated with a broken line 90. The masking may be achieved via application of tape or some other conventional technique that is well known in this art.

A chemical blocking agent is then applied to the unmasked (exposed) portion of the base 26. This would include all surface areas on the outside of the broken line 90, as well as those surfaces of the base 26 that are not shown in FIG. 3. The chemical blocking agent may be applied via spraying, painting, or other techniques that are well known in this art. Numerous and varied conventional blocking agents may be suitably implemented.

The masking is removed, and the base 26 is dunked into a chrome bath, coating the portion 90 of the base that does not have the chemical blocking agent applied. In FIG. 3, chrome would be applied to the area inside the broken line 90.

Figure 4:
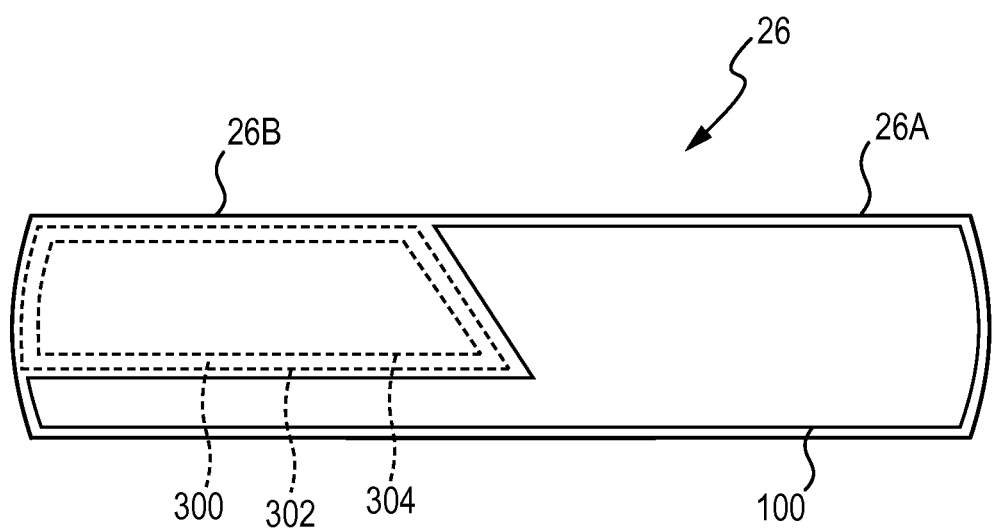
FIG. 4 is another schematic view of the base depicted in FIG. 3.

FIG. 4 depicts the base 26 after it has been selectively chromed. That is, the chrome finish 100 has been applied to the first portion 26A of the base 26. The reflector lens (not shown) can then be mounted on the second portion 26B (or non-chromed portion) of the base 26. In this example embodiment, the mounting location 300 of the reflector lens is defined between the broken lines 302, 304. As shown, the entire chrome finish 100 is located on the outside of the mounting location 300 of the reflector lens.

The reflector lens 24 can be mounted on the base 26 using numerous and varied techniques that are well known in this art. By way of example only, the components can be fixed together via welding and/or application of adhesives and other conventional fastening mechanisms. A continuous and gapless joint can be provided at the mounting location 300 between the reflector lens 24 and the base 26. Thus, an enclosed space may exist between the reflector lens 24 and the second portion 26B of the base 26.

The reflector lens 24 may reside entirely on the outward facing side of the base 26. It is preferable that no portion of the reflector lens 24 resides on the inward facing side of the base 26. The reflector lens 24 may not be directly connected to the bumper cover 210. In this way, the relative positioning between the reflector lens 24 and the chrome accent piece 100 can be determined and fixed independent of any connection between the reflector lens 24 and the bumper cover 210.

The reflector lens 24 can be fabricated from transparent materials and have an internal structure adapted to redirect and reflect light by means of internal reflection. The reflector lens 24 can be of numerous and varied colors, shapes and sizes. Typical reflector lens colors include red, amber and clear.

Figure 5:
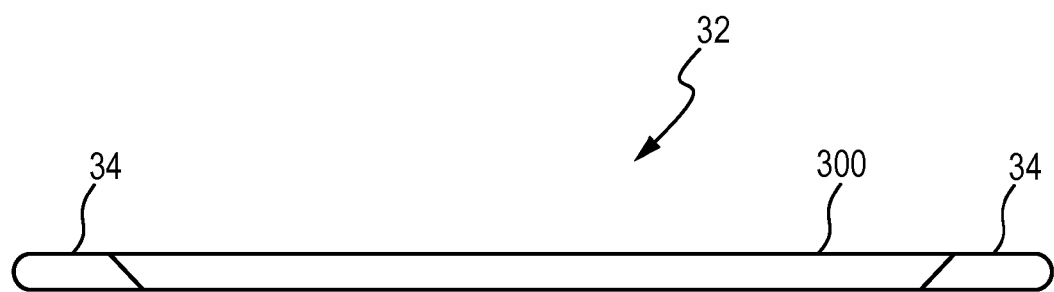
FIG. 5 is a schematic view of a reflex reflector according to another non-limiting embodiment.

In FIGS. 2-4, the reflex reflector may include only a single reflector lens. The present teachings are not, however, limited in this regard. For example, and with reference to FIG. 5, the reflex reflector 32 includes two reflector lenses 34. The reflector lenses 34 are mounted on non-chromed portions of the base that are not shown. The portion of the base situated between the reflector lenses 34 is chromed, and thus serves as an accent piece 300. Of course more than two reflector lenses may be suitably implemented.

Figure 6:
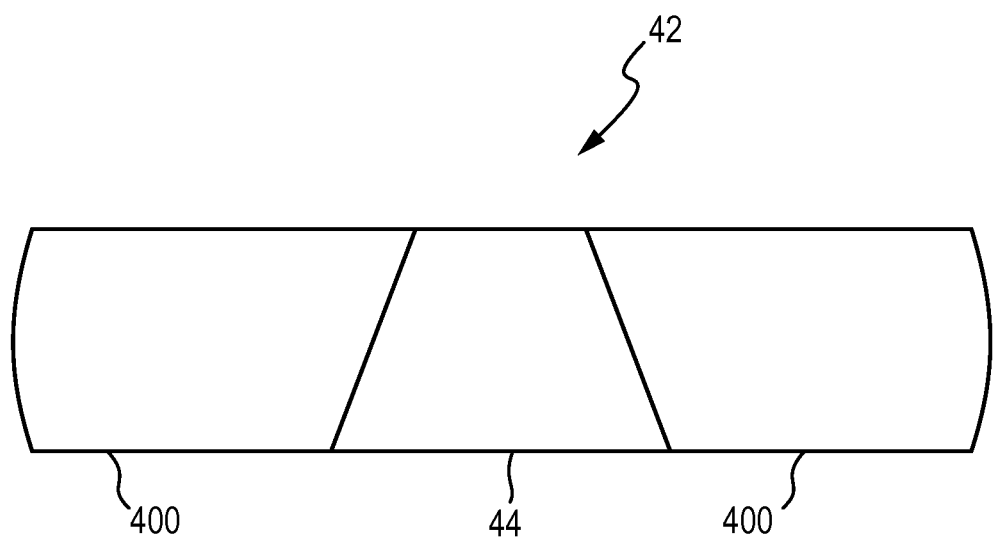
FIG. 6 is a schematic view of a reflex reflector according to another non-limiting embodiment.

In FIGS. 2-5, the reflex reflector may include only a single accent piece. The present teachings are not, however, limited in this regard. For example, and with reference to FIG. 6, the reflex reflector 42 includes two accent pieces 400. Here, the accent pieces (that is, the chromed portions of the base) are spaced apart from each other. The reflector lens 44 is mounted on a non-chromed portion of the base that is not shown. Of course more than two accent pieces may be suitably implemented. It will also be appreciated that the reflex reflector may include a plurality of accent pieces and a plurality of reflector lenses.

According to non-limiting embodiments, the base includes the first portion (with a metallic coating) and the second portion (without a metallic coating), which are of a unitary, one-piece construction. In this way, the number of components can be diminished as compared with a case where a conventional reflex reflector and a conventional accent piece are separately provided. Further, because the presently taught base is of a unitary, one-piece construction, no clearance gaps exist (no do they develop over time) between the reflex reflector and the accent piece. This configuration may yield an aerodynamic advantage, and may reduce wind and vibration noise that would otherwise be incurred during travelling of the vehicle. The bumper assembly process can also be simplified.

Although the foregoing description is directed to the preferred embodiments of the present teachings, it is noted that other variations and modifications will be apparent to those skilled in the art, and which may be made without departing from the spirit or scope of the present teachings.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "around", "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What is claimed is:

1. A reflex reflector comprising:
a base having a first portion with a metallic coating and a second portion without a metallic coating; and
a reflector lens mounted on only the second portion of the base;
wherein the first portion and the second portion of the base are of a unitary, one-piece construction.

2. The reflex reflector according to claim 1, wherein the metallic coating comprises a plating film.

3. The reflex reflector according to claim 2, wherein the plating film comprises a chrome plating.

4. The reflex reflector according to claim 2, wherein the base comprises a plastic material.

5. The reflex reflector according to claim 1, wherein the reflector lens is mounted on the base via a weld.

6. The reflex reflector according to claim 5, wherein an enclosed space is defined between the reflector lens and the second portion of the base.

7. The reflex reflector according to claim 1, wherein the base has a front side and back side; and
wherein the reflector lens and the metallic coating are provided on the front side of the base.

8. The reflex reflector according to claim 1, wherein the reflector lens comprises one of plastic and glass.

9. The reflex reflector according to claim 1, wherein two reflector lenses are mounted on only the second portion of the base.

10. A bumper assembly comprising:
a bumper cover having a recess; and
a reflex reflector mounted in the recess, the reflex reflector including
a base having a first portion with a metallic coating and a second portion without a metallic coating, and
a reflector lens mounted on only the second portion of the base;
wherein the first portion and the second portion of the base are of a unitary, one-piece construction.

11. The bumper assembly according to claim 10, wherein the metallic coating comprises a plating film.

12. The bumper assembly according to claim 11, wherein the plating film comprises a chrome plating.

13. The bumper assembly according to claim 11, wherein the base comprises a plastic material.

14. The bumper assembly according to claim 10, wherein the reflector lens is mounted on the base via a weld.

15. The bumper assembly according to claim 10, wherein the reflector lens is not directly connected to the bumper cover.

16. The bumper assembly according to claim 10, wherein the reflector lens is located on only an outward facing side of the base.

17. The bumper assembly according to claim 10, wherein the reflex reflector comprises two reflector lenses mounted on only the second portion of the base.

18. The bumper assembly according to claim 17, wherein the two reflector lenses are spaced apart from each other.

19. The bumper assembly according to claim 17, wherein the metallic coating is provided on a surface of the first portion of the base located between the two reflector lenses.

* * * * *